United States Patent
Okabe

(10) Patent No.: US 10,818,938 B2
(45) Date of Patent: Oct. 27, 2020

(54) FUEL CELL STACK HAVING LAMINATED CELLS

(71) Applicant: TOYOTA JIDOSHA KABUSHIKI KAISHA, Toyota-shi, Aichi-ken (JP)

(72) Inventor: Hiroki Okabe, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 101 days.

(21) Appl. No.: 15/837,687

(22) Filed: Dec. 11, 2017

(65) Prior Publication Data

US 2018/0166706 A1    Jun. 14, 2018

(30) Foreign Application Priority Data

Dec. 13, 2016    (JP) ................ 2016-241501

(51) Int. Cl.
*H01M 8/02* (2016.01)
*H01M 8/0267* (2016.01)
(Continued)

(52) U.S. Cl.
CPC ....... *H01M 8/0267* (2013.01); *H01M 8/0258* (2013.01); *H01M 8/0273* (2013.01);
(Continued)

(58) Field of Classification Search
None
See application file for complete search history.

(56) References Cited

U.S. PATENT DOCUMENTS

| 2003/0087140 A1* | 5/2003 | Kikuchi | H01M 8/0267 |
| | | | 429/434 |
| 2009/0075134 A1* | 3/2009 | Tanaka | H01M 8/0206 |
| | | | 429/434 |

(Continued)

FOREIGN PATENT DOCUMENTS

| CN | 101438440 A | 5/2009 |
| CN | 102569845 A | 7/2012 |

(Continued)

*Primary Examiner* — Ula C Ruddock
*Assistant Examiner* — Tony S Chuo
(74) *Attorney, Agent, or Firm* — Hunton Andrews Kurth LLP

(57) ABSTRACT

A fuel cell stack includes a plurality of cells laminated. Each of the cells includes: a membrane electrode gas diffusion layer assembly; an insulating member; a first separator including a first gas passage and a first refrigerant passage; first, second, and third manifolds penetrating through the insulating member and the first separator such that a first gas, a second gas, and a refrigerant circulate through the first, second, and third manifolds, respectively; and a second separator including a second gas passage and a second refrigerant passage and configured to sandwich the membrane electrode gas diffusion layer assembly and the insulating member together with the first separator. In the each of the cells, the insulating member includes a first communication portion, a second communication portion, and a third communication portion, and the first separator has a communication opening via which the third communication portion communicates with the first refrigerant passage.

7 Claims, 6 Drawing Sheets

(51) Int. Cl.
　　　*H01M 8/0258*　　　(2016.01)
　　　*H01M 8/0273*　　　(2016.01)
　　　*H01M 8/1004*　　　(2016.01)
　　　*H01M 8/242*　　　(2016.01)
　　　*H01M 8/2485*　　　(2016.01)
　　　*H01M 8/1018*　　　(2016.01)
　　　*H01M 8/04029*　　　(2016.01)
　　　*H01M 8/2483*　　　(2016.01)

(52) U.S. Cl.
　　　CPC ..... *H01M 8/04029* (2013.01); *H01M 8/1004* (2013.01); *H01M 8/1018* (2013.01); *H01M 8/242* (2013.01); *H01M 8/2483* (2016.02); *H01M 8/2485* (2013.01); *H01M 2008/1095* (2013.01)

(56) References Cited

U.S. PATENT DOCUMENTS

2015/0188152 A1\* 7/2015 Mitsuta ............... H01M 8/0258
　　　　　　　　　　　　　　　　　　　　　　　429/481
2016/0104909 A1 4/2016 Kawasumi et al.

FOREIGN PATENT DOCUMENTS

JP　　　2007-324122 A　　12/2007
JP　　　2016-076440 A　　5/2016

\* cited by examiner

FUEL CELL STACK HAVING LAMINATED CELLS

INCORPORATION BY REFERENCE

The disclosure of Japanese Patent Application No. 2016-241501 filed on Dec. 13, 2016 including the specification, drawings and abstract is incorporated herein by reference in its entirety.

BACKGROUND

1. Technical Field

The present disclosure relates to a fuel cell stack.

2. Description of Related Art

There has been known a fuel cell stack in which a plurality of cells is laminated. A fuel cell stack of Japanese Patent Application Publication No. 2007-324122 (JP 2007-324122 A) is configured such that two types of cells having different structures are laminated alternately.

SUMMARY

In the fuel cell stack of JP 2007-324122 A, a reactant gas supplied to one cell flows from a manifold through a part between the one cell and a cell adjacent to one side of the one cell. Further, a reactant gas supplied to a cell adjacent to the other side of the one cell flows from the manifold through a part between the one cell and the cell on the other side. Accordingly, the one cell has a structure for receiving supply of the reactant gas from the cell on the one side, and a structure for supplying the reactant gas to the cell on the other side. This also applies to the cells on the one side and on the other side. On this account, in each cell, in order to prevent a received reactant gas from being mixed with a reactant gas to be supplied, the structure for receiving the supply and the structure for the supply are provided at different positions. Further, it is necessary to laminate the one cell and the cell on the one side such that the structure for receiving the supply in the one cell is placed at a position corresponding to the structure for the supply in the cell on the one side. Similarly, it is necessary to laminate the cell on the other side and the one cell such that the structure for receiving the supply in the cell on the other side is placed at a position corresponding to the structure for the supply in the one cell. The same applies to structures related to refrigerants supplied between the one cell and the cell on the one side and between the cell on the other side and the one cell. Thus, two types of cells collaborate with each other so as to secure supply of a reactant gas to one of the two types of cells and supply of a refrigerant between the cells.

However, in a case where two types of cells are laminated alternately as such, an assembly operation of a fuel cell stack may be complicated.

In view of this, the present disclosure provides a fuel cell stack that restrains its assembly operation from being complicated.

One aspect of the disclosure relates to a fuel cell stack including a plurality of cells laminated in the same direction. Each of the cells includes: a membrane electrode gas diffusion layer assembly in which a catalyst layer and a gas diffusion layer are formed on either side of an electrolyte membrane such that a peripheral region of one surface of the electrolyte membrane is exposed; an insulating member joined to the peripheral region of the electrolyte membrane and having an insulating property; a first separator including a first gas passage through which a first gas circulates, and a first refrigerant passage through which a refrigerant circulates, the first gas passage being provided on a side closer to the membrane electrode gas diffusion layer assembly, the first refrigerant passage being provided on an opposite side to the membrane electrode gas diffusion layer assembly; a first manifold, a second manifold, and a third manifold penetrating through the insulating member and the first separator such that the first gas, a second gas, and the refrigerant circulate through the first manifold, the second manifold, and the third manifold, respectively; and a second separator including a second gas passage through which the second gas circulates, and a second refrigerant passage through which the refrigerant circulates, the second gas passage being provided on a side closer to the membrane electrode gas diffusion layer assembly, the second refrigerant passage being provided on an opposite side to the membrane electrode gas diffusion layer assembly, the second separator being smaller than respective outer peripheral shapes of the insulating member and the first separator, so as to be provided away from the first manifold, the second manifold, and the third manifold, the second separator being configured to sandwich the membrane electrode gas diffusion layer assembly and the insulating member together with the first separator. The plurality of cells is laminated such that the first refrigerant passage of a first cell of two cells adjacent to each other among the plurality of cells is opposed to the second refrigerant passage of a second cell of the two cells. The each of the cells is configured such that: the insulating member includes a first communication portion via which the first manifold communicates with the first gas passage, a second communication portion via which the second manifold communicates with the second gas passage, and a third communication portion communicating with the third manifold, and the first separator has a communication opening via which the third communication portion communicates with the first refrigerant passage.

As such, the first manifold and the second manifold of the insulating member communicate with the first gas passage and the second gas passage of the first cell including the insulating member through the first communicating passage and the second communicating passage formed in the insulating member of the first cell, respectively. Further, the third manifold of the insulating member can communicate with the first refrigerant passage of the first cell including the insulating member through the third communication portion of the insulating member of the first cell and the communication opening of the first separator. Here, the first refrigerant passage of the first cell is opposed to the second refrigerant passage of the second cell adjacent to the first cell. Accordingly, the third manifold can communicate with the second cell. As such, the first gas passage, the second gas passage, and the first refrigerant passage of the cell including the insulating member can communicate with the first manifold, the second manifold, and the third manifold, respectively, by means of the insulating member. On this account, even in a case where cells of the same type are laminated, the first gas passage, the second gas passage, and the first refrigerant passage of each cell can communicate with the first manifold, the second manifold, and the third manifold, respectively, so that an assembly operation is restrained from being complicated.

The each of the cells may be configured such that the insulating member includes a frame-shaped base material configured such that an inner peripheral side of one surface of the base material is joined to the peripheral region of the electrolyte membrane, and the other surface of the base material on an opposite side to the one surface abuts with the first separator, and a sealing portion provided on the one surface of the base material; the first communication portion, the second communication portion, and the third communication portion are formed on the base material; and the sealing portion includes a first sealing portion, a second sealing portion, and a third sealing portion positioned outside the second separator so as to surround the first manifold, the second manifold, and the third manifold, respectively, and a fourth sealing portion configured to surround the membrane electrode gas diffusion layer assembly so as to seal between the base material and the second separator. The plurality of cells may be laminated such that the first sealing portion, the second sealing portion, and the third sealing portion of the first cell abut with the first separator of the second cell, the first separator of the second cell being opposed to the second separator of the first cell.

At least one of the first sealing portion, the second sealing portion, and the third sealing portion of the first cell among the cells may be configured to have a shape projecting from the one surface of the base material, to have elasticity, and to be compressed by the first separator of the second cell.

The fourth sealing portion of the first cell among the cells may be configured to have a shape projecting from the one surface of the base material, to have elasticity, and to be compressed by the second separator of the first cell.

The each of the cells may be configured such that the first communication portion is formed on the base material so as to cross the first sealing portion and the fourth sealing portion from the first manifold, and one end of the first communication portion is opened at an inner peripheral edge of the base material.

The each of the cells may be configured such that the second communication portion is formed on the base material so as to cross the second sealing portion and the fourth sealing portion from the second manifold, and one end of the second communication portion is opened on the one surface of the base material on an inner side relative to the fourth sealing portion.

The each of the cells may be configured such that the third communication portion is formed on the base material so as to cross the third sealing portion from the third manifold.

It is possible to provide a fuel cell stack that restrains its assembly operation from being complicated.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
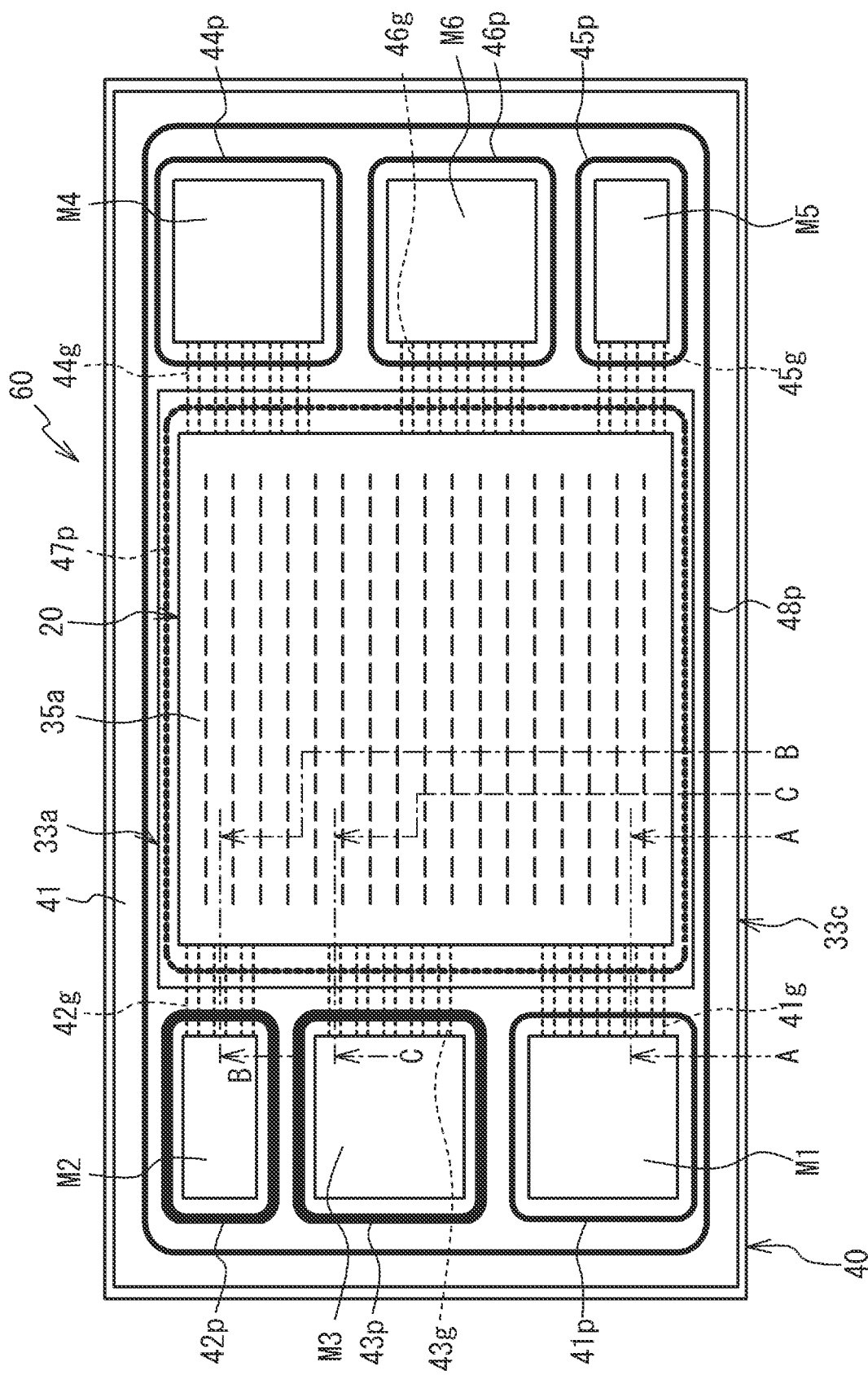
FIG. 1 is a view illustrating a cell of a fuel cell stack.
Figure 2:
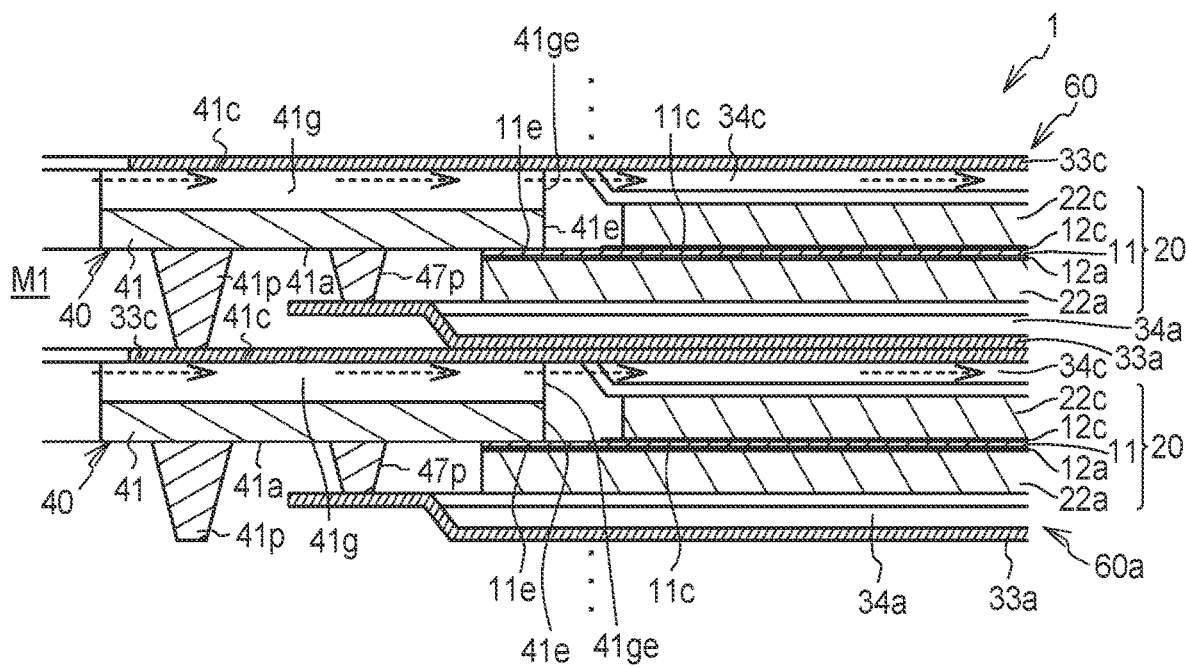
FIG. 2 is a sectional view taken along a line A-A in FIG. 1.
Figure 3:
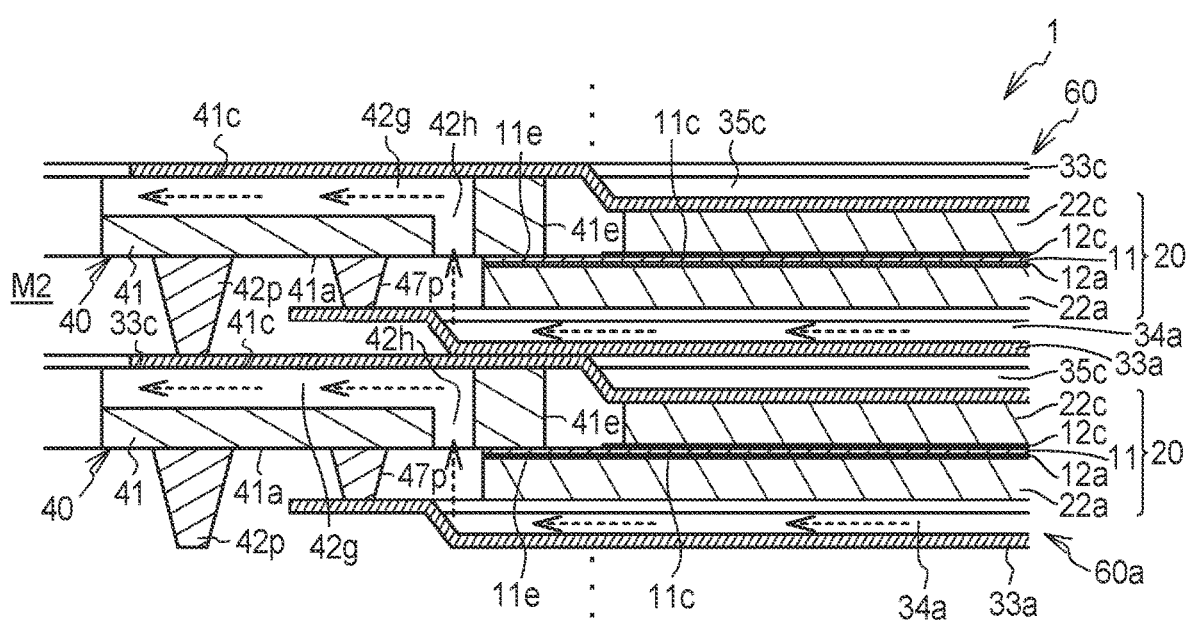
FIG. 3 is a sectional view taken along a line B-B in FIG. 1.
Figure 4:
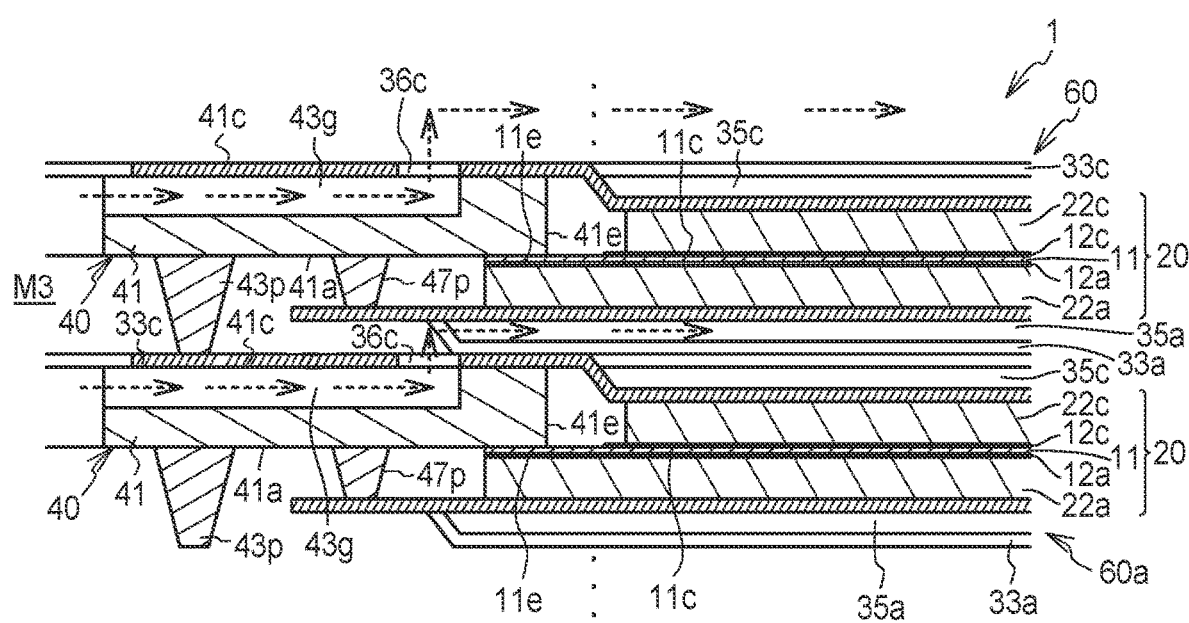
FIG. 4 is a sectional view taken along a line C-C in FIG. 1.

FIG. 1 is a view illustrating a cell of a fuel cell stack. FIG. 2 is a sectional view taken along a line A-A in FIG. 1. FIG. 3 is a sectional view taken along a line B-B in FIG. 1. FIG. 4 is a sectional view taken along a line C-C in FIG. 1. As illustrated in FIGS. 2 to 4, a fuel cell stack 1 has a stack structure in which cells 60, 60a . . . are laminated in a plurality of layers in the same direction. FIG. 1 corresponds to a view seen from a lower side of the cell 60 in FIGS. 2 to 4. These cells 60, 60a . . . are solid polymer fuel cells configured to generate an electric power upon receipt of a fuel gas (e.g., hydrogen) and an oxidant gas (e.g., oxygen) as reactant gases. The oxidant gas is an example of a first gas, and the fuel gas is an example of a second gas. Each of the cells 60, 60a . . . includes a membrane electrode gas diffusion layer assembly 20 (hereinafter referred to as a MEGA (Membrane Electrode Gas diffusion layer Assembly)), an insulating member 40 for supporting a MEGA 20, and a cathode-side separator 33c (hereinafter referred to as a first separator) and an anode-side separator 33a (hereinafter referred to as a second separator) sandwiching the MEGA 20 therebetween. The MEGA 20 includes an anode-side gas diffusion layer 22a and a cathode-side gas diffusion layer 22c (hereinafter referred to as diffusion layers). The insulating member 40 has a generally frame shape and its inner peripheral side is joined to a peripheral region of the MEGA 20, but details thereof will be described later. The insulating member 40 is an example of an insulating member.

As illustrated in FIG. 1, manifolds M1 to M3 are formed on one side out of two short sides of the first separator 33c and the insulating member 40, and manifolds M4 to M6 are formed on the other side. These manifolds M1 to M6 are each defined such that respective through-holes formed in the plurality of cells 60, 60a . . . overlap with each other, and penetrate in a laminating direction of the cells 60, 60a . . . . Note that the second separator 33a does not have such a hole, and an outer peripheral shape of the second separator 33a is smaller than those of the first separator 33c and the insulating member 40, so that the second separator 33a has a shape away from the manifolds M1 to M6. More specifically, the manifold M1 is a cathode inlet manifold for supplying an oxidant gas to the plurality of cells 60, 60a . . . . The manifold M2 is an anode outlet manifold to which a fuel gas from the plurality of cells 60, 60a . . . is discharged. The manifold M3 is a refrigerant inlet manifold for supplying a refrigerant to between the plurality of cells 60, 60a . . . . The manifold M4 is a cathode outlet manifold to which the oxidant gas from the plurality of cells 60, 60a . . . is discharged. The manifold M5 is an anode inlet manifold for supplying the fuel gas to the plurality of cells 60, 60a . . . . The manifold M6 is a refrigerant outlet manifold to which the refrigerant from between the plurality of cells 60, 60a . . . is discharged. Note that, in the example of FIG. 1, the manifolds M1 to M3 are placed on one short side of the cell 60 and the manifold M3 is placed between the manifolds M1 and M2, while the manifolds M4 to M6 are placed on the other short side of the cell 60 and the manifold M6 is placed between the manifolds M4 and M5. However, positions of these manifolds are not limited to this. Each of the manifolds M1 and M4 is an example of a first manifold penetrating through the insulating member 40 and the first separator 33c such that the oxidant gas circulates therethrough. Each of the manifolds M2 and M5 is an example of a second manifold penetrating through the insulating member 40 and the first separator 33c such that the fuel gas circulates therethrough. Each of the manifolds M3 and M6 is an example of a third manifold penetrating through the insulating member 40 and the first separator 33c such that the refrigerant circulates therethrough.

As illustrated in FIG. 2, the MEGA 20 includes the diffusion layers 22a and 22c, an electrolyte membrane 11 having a generally rectangular shape, and a cathode-side catalyst layer 12c and an anode-side catalyst layer 12a (hereinafter referred to as catalyst layers) formed on one surface (an upper surface in FIG. 2) of the electrolyte membrane 11 and on the other surface (a lower surface in FIG. 2), respectively. The electrolyte membrane 11 is a solid polymer thin film exhibiting an excellent proton conductivity in a wet condition, and is, for example, a fluorinated ion exchange membrane. The electrolyte membrane 11 includes a peripheral region 11e, and an intermediate region 11c surrounded by the peripheral region 11e.

The catalyst layer 12c is formed in the intermediate region 11c on the one surface of the electrolyte membrane 11, but is not formed in the peripheral region 11e. The catalyst layer 12a is formed so as to generally align with a position of an end of the electrolyte membrane 11. That is, the catalyst layer 12a is formed on a generally whole area of the other surface of the electrolyte membrane 11 including the peripheral region 11e and the intermediate region 11c of the electrolyte membrane 11. The catalyst layers 12a and 12c are formed such that carbon carriers that carry platinum (Pt) or the like and ionomer having proton conductivity are applied to the electrolyte membrane 11, for example.

The diffusion layers 22a and 22c are joined to the catalyst layers 12a and 12c, respectively. The diffusion layers 22a and 22c are made of a material having gas permeability and electric conductivity, e.g., a porous fiber base material such as carbon fiber or graphite fiber. Further, at least one of the diffusion layers 22a and 22c is not limited to the above configuration, and may be a metal porous body such as expanded metal formed by cutting and bending machining, lathe cut metal formed by lathe machining, or foamed sintered compact, for example. Further, at least one of the diffusion layers 22a and 22c may be configured to include a porous fiber base material and a metal porous body joined to each other. The diffusion layer 22c is configured such that its end is positioned on a slightly inner side relative to an end of the catalyst layer 12c or provided at a position generally aligned therewith. Accordingly, the diffusion layer 22c is provided so as to overlap with the intermediate region 11c of the electrolyte membrane 11 via the catalyst layer 12c, but not to overlap with the peripheral region 11e. Hereby, the diffusion layer 22c is provided so as to expose the peripheral region 11e of the electrolyte membrane 11.

Similarly, the diffusion layer 22a is formed such that its end is placed at a position generally aligned with an end of the catalyst layer 12a, but as mentioned earlier, the catalyst layer 12a is formed on the generally whole area of the other surface of the electrolyte membrane 11. On this account, the diffusion layer 22a is provided so as to overlap with not only the intermediate region 11c, but also the peripheral region 11e via the catalyst layer 12a. Since the diffusion layer 22a is provided so as to also overlap with the peripheral region 11e as such, the electrolyte membrane 11 and the catalyst layers 12a and 12c are supported stably.

As illustrated in FIG. 2, a cathode passage 34c via which the manifolds M1 and M4 communicate with each other so that the oxidant gas flows therethrough is formed on a surface of the first separator 33c on a MEGA-20 side. Further, as illustrated in FIG. 4, a refrigerant passage 35c via which the manifolds M3 and M6 communicate with each other so that the refrigerant flows therethrough is formed on a surface of the first separator 33c on an opposite side to the MEGA 20. The cathode passage 34c and the refrigerant passage 35c are formed in an irregular shape on two sides of the same first separator 33c. The cathode passage 34c is an example of a first gas passage through which the oxidant gas circulates on the MEGA-20 side, and the refrigerant passage 35c is an example of a first refrigerant passage through which the refrigerant circulates on the opposite side to the MEGA 20. Similarly, an anode passage 34a via which the manifolds M2 and M5 communicate with each other so that the fuel gas flows therethrough is formed on a surface of the second separator 33a on the MEGA-20 side. A refrigerant passage 35a via which the manifolds M3 and M6 communicate with each other so that the refrigerant flows therethrough is formed on a surface of the second separator 33a on an opposite side to the MEGA 20. The anode passage 34a and the refrigerant passage 35a are also formed in an irregular shape on two sides of the same second separator 33a. The anode passage 34a is an example of a second gas passage through which the fuel gas circulates on the MEGA-20 side, and the refrigerant passage 35a is an example of a second refrigerant passage through which the refrigerant circulates on the opposite side to the MEGA 20.

An outer peripheral shape of the insulating member 40 is larger than the whole MEGA 20. Meanwhile, its inner peripheral shape is smaller than the electrolyte membrane 11, the catalyst layer 12a, and the diffusion layer 22a, but is larger than the catalyst layer 12c and the diffusion layer 22c. Accordingly, a size of a whole inner peripheral edge 41e of the insulating member 40 is smaller than the electrolyte membrane 11, the catalyst layer 12a, and the diffusion layer 22a. Further, the insulating member 40 includes a frame-shaped base material 41 having a thin sheet shape, and sealing portions 41p to 48p formed in the base material 41. The base material 41 is made of resin or rubber having an insulating property. The base material 41 is configured such that: an inner peripheral side of one surface 41a thereof is joined to the peripheral region 11e of the electrolyte membrane 11; and the other surface 41c on an opposite side to the surface 41a abuts with the first separator 33c so as to be joined thereto by adhesive (not shown), so that a sealing characteristic is secured. Note that the insulating member 40 may not necessarily be joined to the first separator 33c, and the sealing characteristic therebetween may be secured by gasket (not shown). The surfaces 41a and 41c of the base material 41 are an example of one surface and an example of the other surface, respectively. Communication grooves 41g to 46g communicating with the manifolds M1 to M6, respectively, and separated from each other, and communicating holes 42h and 45h communicating with the communication grooves 42g and 45g, respectively, are formed in the base material 41. Details thereof will be described later.

The sealing portions 41p to 48p are formed on the surface 41a of the base material 41 in a projecting manner. The sealing portions 41p to 48p are each made of rubber having an insulating property and elasticity, and for example, a thermoplastic elastomer. The sealing portions 41p to 46p have a frame shape surrounding the manifolds M1 to M6, respectively, and are placed outside the second separator 33a. The sealing portion 47p has a frame shape surrounding the MEGA 20 along the inner peripheral edge 41e of the insulating member 40, and overlaps with the second separator 33a. Respective heights of the sealing portions 41p to 46p from the surface 41a of the base material 41 are higher than the sealing portion 47p. The sealing portion 48p has a frame shape along an outer peripheral edge of the insulating member 40, and is positioned outside the second separator 33a. The sealing portions 41p and 44p are examples of first sealing portions surrounding the manifolds M1 and M4, respectively, and positioned outside the second separator 33a. The sealing portions 42p and 45p are examples of second sealing portions surrounding the manifolds M2 and M5, respectively, and positioned outside the second separator 33a. The sealing portions 43p and 46p are examples of third sealing portions surrounding the manifolds M3 and M6, respectively, and positioned outside the second separator 33a.

The sealing portions 41p to 46p abut, in a compressed manner, with the first separator 33c of the cell 60a, adjacent to the second separator 33a of the cell 60, so that a sealing characteristic between the base material 41 of the cell 60 and the first separator 33c of the cell 60a is secured by elastic restoring forces of the sealing portions 41p to 46p. The sealing portion 47p of the cell 60 abuts, in a compressed manner, with the second separator 33a of the cell 60, so that a sealing characteristic between the base material 41 of the cell 60 and the second separator 33a is secured by an elastic restoring force of the sealing portion 47p. Although not illustrated herein, the sealing portion 48p of the cell 60 abuts, in a compressed manner, with the first separator 33c of the cell 60a, so that a sealing characteristic between the base material 41 of the cell 60 and the first separator 33c of the cell 60a is secured by an elastic restoring force of the sealing portion 48p. Further, the sealing portions 41p to 48p are not joined to the first separator 33c or the second separator 33a by adhesive or the like. This secures the sealing characteristic and improves an assembly workability of the fuel cell stack 1.

Note that the base material 41 and at least one of the sealing portions 41p to 48p may be made of the same material in an integrated manner or separately to be joined to each other, or made of different materials in an integrated manner or separately to be joined to each other. Further, a tip end of at least one of the sealing portions 41p to 46p and 48p may be joined to the first separator 33c of the cell 60a by adhesive or the like, and a tip end of the sealing portion 47p may be joined to the second separator 33a by adhesive or the like. In this case, the sealing portions may not necessarily have elasticity, and may be made of resin that does not have elasticity. Although not illustrated herein, the whole plurality of cells thus laminated is sandwiched between a pair of terminal plates. Further, the whole plurality of cells including the pair of terminal plates is sandwiched between a pair of insulation plates. Furthermore, the whole plurality of cells including the pair of insulation plates is sandwiched between a pair of end plates.

Figure 5:
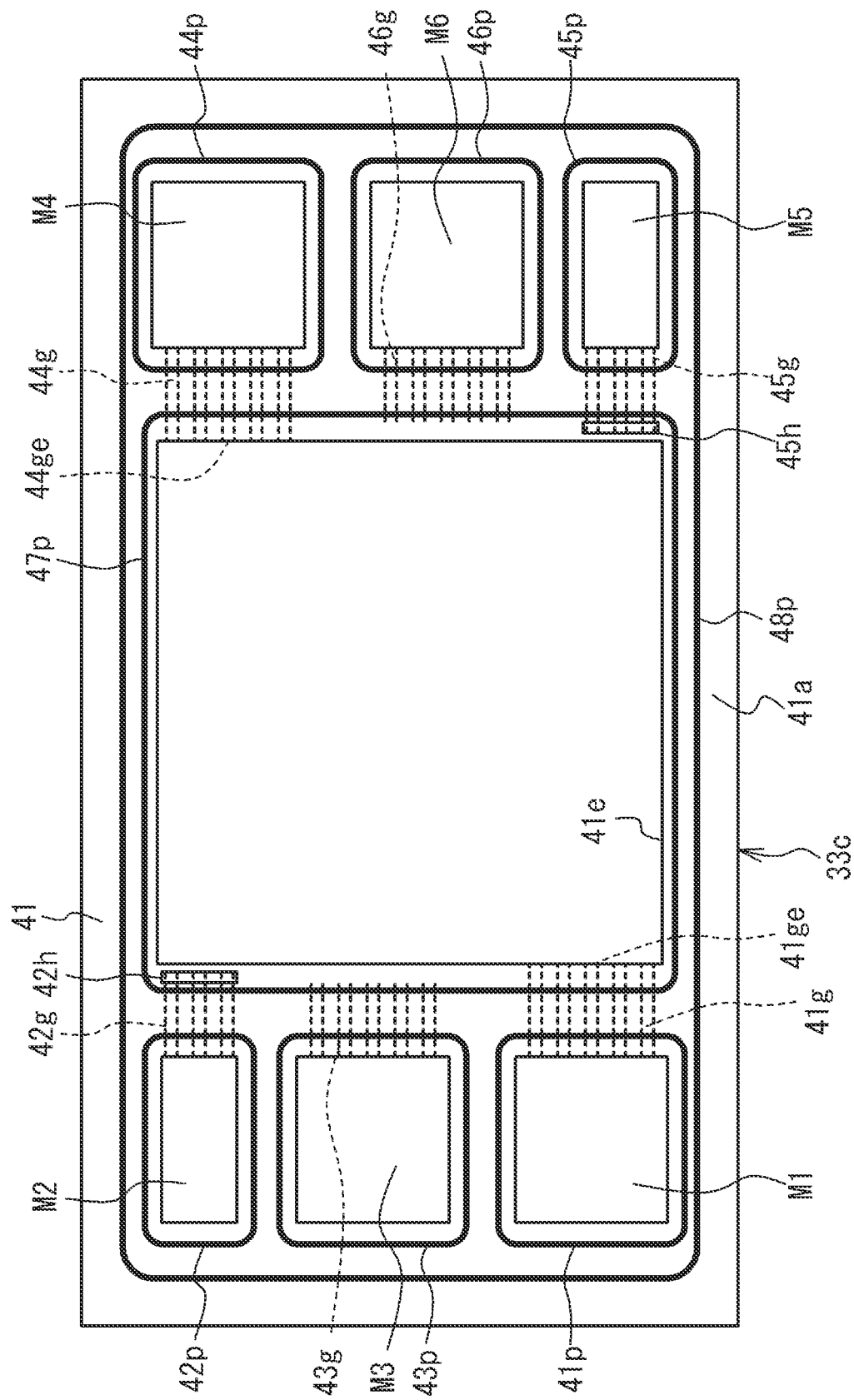
FIG. 5 is a view illustrating an insulating member.

Next will be described the communication grooves 41g to 46g. FIG. 5 is a view illustrating the insulating member 40. First described is the communication grooves 41g. As illustrated in FIGS. 1, 2, and 5, the plurality of communication grooves 41g is formed on a surface-41c side in a recessed manner, and extends from the manifold M1 to the inner peripheral edge 41e so as to cross the sealing portions 41p and 47p in a plane direction of the base material 41. Accordingly, ends 41ge of the communication grooves 41g are positioned at the inner peripheral edge 41e of the base material 41. On this account, the oxidant gas is supplied from the manifold M1 to the cathode passage 34c through the communication grooves 41g. Since the communication grooves 41g are not opened on the surface 41a of the base material 41, the cathode passage 34c is partitioned from the anode passage 34a, which prevents the oxidant gas from flowing into the anode passage 34a.

With a similar structure, the oxidant gas from the cathode passage 34c is discharged to the manifold M4 through the plurality of communication grooves 44g. The communication groove 41g is an example of a first communication portion via which the manifold M1 communicates with the cathode passage 34c. Further, the communication groove 44g is also an example of a first communication portion via which the manifold M4 communicates with the cathode passage 34c. Note that ends 44ge of the communication grooves 44g are also positioned at the inner peripheral edge 41e of the base material 41.

As such, the oxidant gas supplied into the cell 60 is directly supplied from the manifold M1 into the cell 60 through the communication grooves 41g of the base material 41 of the cell 60 without passing through a part between the cell 60 and another cell adjacent to the cell 60. Further, the oxidant gas discharged from the cell 60 is also discharged to the manifold M4 through the communication grooves 44g of the base material 41 of the cell 60 without passing through a part between the cell 60 and another cell adjacent to the cell 60. On this account, the supply of the oxidant gas from the manifold M1 to the cell 60 and the discharge of the oxidant gas from the cell 60 to the manifold M4 are secured solely by the cell 60. Accordingly, even if the plurality of cells 60, 60a . . . having the same structure as described above is laminated, the supply of the oxidant gas to the cells and the discharge of the oxidant gas from the cells are secured.

Next will be described the communication grooves 42g. As illustrated in FIGS. 1, 3, and 5, the plurality of communication grooves 42g is formed on the surface-41c side in a recessed manner, extends from the manifold M2 toward the inner peripheral edge 41e in the plane direction of the base material 41 so as to cross the sealing portions 42p and 47p, and is ended just before the inner peripheral edge 41e. The communicating hole 42h is continuous with trailing ends of the plurality of communication grooves 42g. The communicating hole 42h penetrates in a thickness direction of the base material 41. Here, the communicating hole 42h is positioned on an inner side relative to the sealing portion 47p and on an outer side relative to the electrolyte membrane 11, the catalyst layer 12a, and the diffusion layer 22a. On this account, the fuel gas is discharged from the anode passage 34a to the manifold M2 through the communicating hole 42h and the communication grooves 42g. Since the communication grooves 42g and the communicating hole 42h are not opened on the inner peripheral edge 41e, the anode passage 34a is partitioned from the cathode passage 34c, which prevents the fuel gas from flowing into the cathode passage 34c.

With a similar structure, the fuel gas is supplied from the manifold M5 to the anode passage 34a through the plurality of communication grooves 45g and the communicating hole 45h. The communication groove 42g and the communicating hole 42h are examples of a second communication portion via which the manifold M2 communicates with the anode passage 34a. The communication grooves 45g and the communicating hole 45h are examples of a second communication portion via which the manifold M5 communicates with the anode passage 34a.

As such, the fuel gas supplied into the cell 60 is directly supplied from the manifold M5 into the cell 60 through the communication grooves 45g and the communicating hole 45h of the base material 41 of the cell 60 without passing through a part between the cell 60 and another cell adjacent to the cell 60. Further, the fuel gas discharged from the cell 60 is discharged to the manifold M2 through the communication grooves 42g and the communicating hole 42h of the base material 41 of the cell 60 without passing through a part between the cell 60 and another cell adjacent to the cell 60. On this account, the supply of the fuel gas from the manifold M5 to the cell 60 and the discharge of the fuel gas from the cell 60 to the manifold M2 are secured solely by the cell 60. Accordingly, even if the plurality of cells 60, 60a . . . having the same structure as described above is laminated, the supply of the fuel gas to the cells and the discharge of the fuel gas from the cells are secured.

Figure 6:
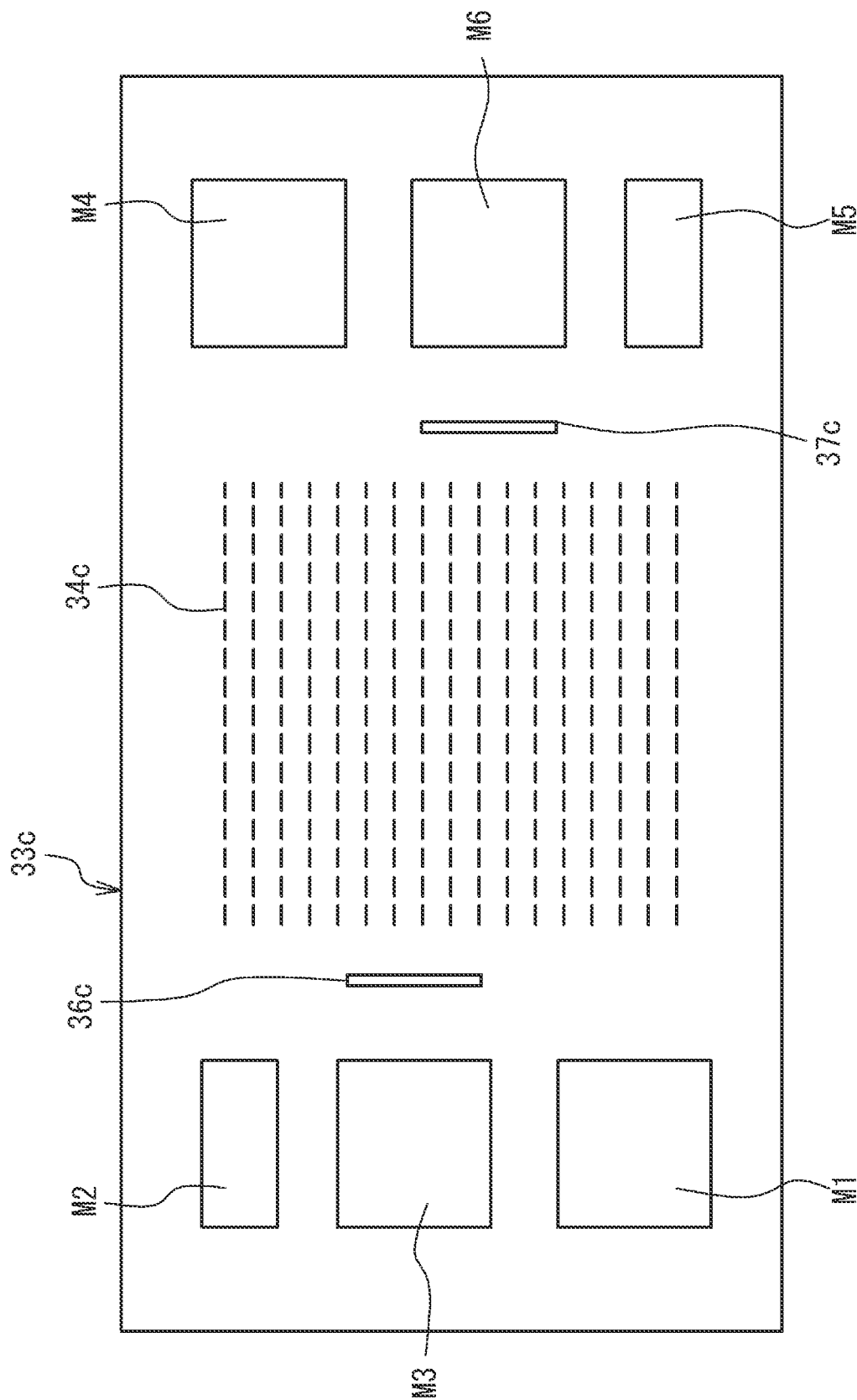
FIG. 6 is a view illustrating a first separator.

Next will be described the communication grooves 43g. FIG. 6 is a view illustrating the first separator 33c. As illustrated in FIGS. 1, 4, and 5, the plurality of communication grooves 43g is formed on the surface-41c side in a recessed manner, extends from the manifold M3 toward the inner peripheral edge 41e in the plane direction of the base material 41 so as to cross the sealing portions 43p and 47p, and is ended just before the inner peripheral edge 41e. Further, as illustrated in FIG. 6, a communication opening 36c opposed to trailing ends of the plurality of communication grooves 43g is formed in the first separator 33c. The communication opening 36c is formed at a position away from a surface of an irregular-shaped portion of the first separator 33c, which abuts with an irregular-shaped portion of the second separator 33a. More specifically, the communication opening 36c is formed on an upstream side relative to the refrigerant passage 35a of the second separator 33a opposed to the first separator 33c. On this account, the refrigerant from the manifold M3 is supplied to the refrigerant passage 35c through the communication grooves 43g and the communication opening 36c. Here, the refrigerant passage 35c of the cell 60 is opposed to a refrigerant passage of a second separator of a cell (not shown) on an upper side in FIG. 4, and the refrigerant passage 35c of the cell 60a is opposed to the refrigerant passage 35a of the second separator 33a of the cell 60. Accordingly, the refrigerant is supplied to the refrigerant passages 35c and 35a opposed to each other. Since the communication grooves 43g are not opened in either the inner peripheral edge 41e or the surface 41a, the refrigerant passages 35c and 35a are partitioned from the cathode passage 34c and the anode passage 34a, respectively, which prevents the refrigerant from flowing into the cathode passage 34c and the anode passage 34a.

With a similar structure, the refrigerants from the refrigerant passages 35c and 35a are discharged to the manifold M6 through a communication opening 37c formed in the first separator 33c and the plurality of communication grooves 46g formed in the base material 41. Note that the communication opening 37c is formed on a downstream side relative to the refrigerant passage 35a of the second separator 33a opposed to the first separator 33c. The communication groove 43g is an example of a third communication portion communicating with the manifold M3, and the communication opening 36c is an example of a communication opening via which the communication grooves 43g communicate with the refrigerant passage 35c. Similarly, the communication groove 46g is an example of a third communication portion communicating with the manifold M6, and the communication opening 37c is an example of a communication opening via which the communication grooves 46g communicate with the refrigerant passage 35c.

As such, the refrigerant supplied to between the cells 60 and 60a is supplied to between the cells 60 and 60a from the manifold M3 through the communication grooves 43g of the base material 41 inside the cell 60a without passing through a part between the cell 60a and another cell adjacent to the cell 60a. Further, the refrigerant discharged from between the cells 60 and 60a is also discharged to the manifold M6 through the communication grooves 46g of the base material 41 inside the cell 60a without passing through a part between the cell 60a and another cell adjacent to the cell 60a. On this account, the supply of the refrigerant between the cells 60 and 60a from the manifold M3 and the discharge of the refrigerant from the cells 60 and 60a to the manifold M6 are secured solely by the cell 60a. Accordingly, even if the plurality of cells 60, 60a . . . having the same structure is laminated, the supply of the refrigerant between the adjacent cells and the discharge thereof from the adjacent cells are secured.

As described above, the supply and discharge of the oxidant gas, the fuel gas, and the refrigerant to each cell 60 are secured by a single structure of the each cell 60, and therefore, the fuel cell stack 1 of the present embodiment is formed such that the cells 60, 60a . . . of the same type are laminated. On this account, in the assembly operation of the fuel cell stack 1, the cells 60, 60a . . . having the same structure are just laminated in the same direction, and thus, the assembly operation is restrained from being complicated.

Note that, as illustrated in FIG. 4, the refrigerant supplied to between the cells 60 and 60a through the communication opening 36c of the first separator 33c also flows into a part outside the sealing portions 41p to 47p, but inside the sealing portion 48p through between the sealing portions 43p and 47p. As such, the refrigerant passes through an outer peripheral side of the sealing portion 47p closest to the electrolyte membrane 11 among the sealing portions 41p to 48p and easily receiving heat from the electrolyte membrane 11, thereby making it possible to efficiently cool down the cell.

In the above embodiment, the communication grooves 41g to 46g are formed on the surface 41c of the base material 41 in a recessed shape, but are not limited to such a shape. For example, instead of at least one of the communication grooves 41g to 46g, a hole formed between the surfaces 41a and 41c of the base material 41 and extending in the plane direction of the base material 41 may be employed. In the above embodiment, the communicating holes 42h and 45h penetrate from the surface 41c of the base material 41 to the surface 41a, but instead of at least one of the communicating hole 42h and 45h, a bottomed hole that is opened on the surface 41a, but is not opened on the surface 41c may be employed.

The preferred embodiment of the present disclosure has been described above, but the present disclosure is not limited to such a specific embodiment, and various modifications and alterations can be made within the gist of the present disclosure described in Claims.

What is claimed is:

1. A fuel cell stack comprising:
a plurality of cells laminated in the same direction, wherein:
each of the cells includes
a membrane electrode gas diffusion layer assembly in which a catalyst layer and a gas diffusion layer are formed on either side of an electrolyte membrane such that a peripheral region of one surface of the electrolyte membrane is exposed,
an insulating member joined to the peripheral region of the electrolyte membrane and having an insulating property,
a first separator including a first gas passage through which a first gas circulates, and a first refrigerant passage through which a refrigerant circulates, the first gas passage being provided on a side closer to the membrane electrode gas diffusion layer assembly, the first refrigerant passage being provided on an opposite side to the membrane electrode gas diffusion layer assembly, a first manifold, a second manifold, and a third manifold penetrating through the insulating member and the first separator such that the first gas, a second gas, and the refrigerant circulate through the first manifold, the second manifold, and the third manifold, respectively, and a second separator including a second gas passage through which the second gas circulates, and a second refrigerant passage through which the refrigerant circulates, the second gas passage being provided on the side closer to the membrane electrode gas diffusion layer assembly, the second refrigerant passage being provided on the opposite side to the membrane electrode gas diffusion layer assembly, the second separator being smaller than respective outer peripheral shapes of the insulating member and the first separator, so as to be provided away from the first manifold, the second manifold, and the third manifold, the second separator being configured to sandwich the membrane electrode gas diffusion layer assembly and the insulating member together with the first separator;

the plurality of cells is laminated such that the first refrigerant passage of a first cell of two cells adjacent to each other among the plurality of cells is opposed to the second refrigerant passage of a second cell of the two cells; and the each of the cells is configured such that
the insulating member includes a first communication portion via which the first manifold communicates with the first gas passage, a second communication portion via which the second manifold communicates with the second gas passage, and a third communication portion communicating with the third manifold, and a communication opening is formed in the first separator, wherein the insulating member includes a frame-shaped base material and a sealing portion formed in one surface of the base material, and wherein an inner peripheral side of the surface of the base material abuts with the peripheral region of the electrolyte membrane, and the third communication portion is formed on the frame-shaped base material and the third communication portion communicates with the second refrigerant passage through the communication opening.

2. The fuel cell stack according to claim 1, wherein:
the each of the cells is configured such that
the first communication portion, the second communication portion, and the third communication portion are formed on the base material, and the sealing portion includes a first sealing portion, a second sealing portion, and a third sealing portion positioned outside the second separator so as to surround the first manifold, the second manifold, and the third manifold, respectively, and a fourth sealing portion configured to surround the membrane electrode gas diffusion layer assembly so as to seal between the base material and the second separator; and the plurality of cells is laminated such that the first sealing portion, the second sealing portion, and the third sealing portion of the first cell abut with the first separator of the second cell, the first separator of the second cell being opposed to the second separator of the first cell.

3. The fuel cell stack according to claim 2, wherein
at least one of the first sealing portion, the second sealing portion, and the third sealing portion of the first cell among the cells has a shape projecting from the one surface of the base material, has elasticity, and is compressed by the first separator of the second cell.

4. The fuel cell stack according to claim 2, wherein:
the fourth sealing portion of the first cell among the cells has a shape projecting from the one surface of the base material, has elasticity, and is compressed by the second separator of the first cell.

5. The fuel cell stack according to claim 2, wherein
the each of the cells is configured such that the first communication portion is formed on the base material so as to cross the first sealing portion and the fourth sealing portion from the first manifold, and one end of the first communication portion is opened at an inner peripheral edge of the base material.

6. The fuel cell stack according to claim 2, wherein
the each of the cells is configured such that the second communication portion is formed on the base material so as to cross the second sealing portion and the fourth sealing portion from the second manifold, and one end of the second communication portion is opened on the one surface of the base material on an inner side relative to the fourth sealing portion.

7. The fuel cell stack according to claim 2, wherein
the each of the cells is configured such that the third communication portion is formed on the base material so as to cross the third sealing portion from the third manifold.

* * * * *